United States Patent
Wang et al.

(10) Patent No.: US 10,217,223 B2
(45) Date of Patent: Feb. 26, 2019

(54) IMAGE DATA SEGMENTATION (71) Applicant: Hewlett-Packard Development Company, L.P., Houston, TX (US)

(72) Inventors: Su Wang, Palo Alto, CA (US); Kar-Han Tan, Sunnyvale, CA (US); Divya Sharma, Palo Alto, CA (US); Jian Fan, San Jose, CA (US); Jinman Kang, San Diego, CA (US); Yun Tang, San Diego, CA (US); Daniel R Tretter, San Jose, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 15/518,416

(22) PCT Filed: Oct. 28, 2014

(86) PCT No.: PCT/US2014/062735
§ 371 (c)(1),
(2) Date: Apr. 11, 2017

(87) PCT Pub. No.: WO2016/068890
PCT Pub. Date: May 6, 2016

(65) Prior Publication Data
US 2017/0309029 A1    Oct. 26, 2017

(51) Int. Cl.
*G06T 7/12* (2017.01)
*G06T 7/13* (2017.01)
(Continued)

(52) U.S. Cl.
CPC ............... *G06T 7/12* (2017.01); *G06F 3/017* (2013.01); *G06K 9/00208* (2013.01);
(Continued)

(58) Field of Classification Search
CPC .................................. G06T 7/12; G06T 7/13
See application file for complete search history.

(56) References Cited

U.S. PATENT DOCUMENTS

| | | |
|---|---|---|
| 6,324,532 B1 | 11/2001 | Spence et al. |
| 6,829,384 B2 | 12/2004 | Schneiderman et al. |
| (Continued) | | |

FOREIGN PATENT DOCUMENTS

| | | |
|---|---|---|
| KR | 10-2014-0055251 A1 | 10/2009 |
| TW | 200935872 A | 8/2009 |
| TW | 201241547 A | 10/2012 |

OTHER PUBLICATIONS

Ari Visa, "Unsupervised Image Segmentation Based on a Self-organizing Feature Map and a Texture Measure," 1992, In Pattern Recognition, vol. III. Conference C: Image, Speech and Signal Analysis, Proceedings., 11th IAPR International Conference on, pp. 101-104.*

(Continued)

*Primary Examiner* — David F Dunphy
(74) *Attorney, Agent, or Firm* — HP Inc. Patent Department (57) ABSTRACT

According to one example for segmenting image data, image data comprising color pixel data, IR data, and depth data is received from a sensor. The image data is segmented into a first list of objects based on at least one computed feature of the image data. At least one object type is determined for at least one object in the first list of objects. The segmentation of the first list of objects is refined into a second list of objects based on the at least one object type. In an example, the second list of objects is output.

15 Claims, 8 Drawing Sheets

(51) Int. Cl.
*H04N 5/262* (2006.01)
*G06K 9/34* (2006.01)
*G06T 7/11* (2017.01)
*G06K 9/00* (2006.01)
*G06K 9/20* (2006.01)
*G06T 7/10* (2017.01)
*G06F 3/01* (2006.01)
*G01B 11/24* (2006.01)
*G06T 7/194* (2017.01)
*G06T 7/529* (2017.01)
*G06F 3/0354* (2013.01)

(52) U.S. Cl.
CPC .............. *G06K 9/2018* (2013.01); *G06K 9/34* (2013.01); *G06K 9/342* (2013.01); *G06T 7/10* (2017.01); *G06T 7/11* (2017.01); *G06T 7/13* (2017.01); *H04N 5/262* (2013.01); *G01B 11/24* (2013.01); *G06F 3/03547* (2013.01); *G06T 7/194* (2017.01); *G06T 7/529* (2017.01); *G06T 2207/10024* (2013.01); *G06T 2207/10028* (2013.01); *G06T 2207/20016* (2013.01); *G06T 2207/20112* (2013.01); *G06T 2207/20172* (2013.01)

(56) References Cited

U.S. PATENT DOCUMENTS

| | | | |
|---|---|---|---|
| 7,599,561 | B2 | 10/2009 | Wilson et al. |
| 7,710,391 | B2 | 5/2010 | Bell et al. |
| 7,813,561 | B2 | 10/2010 | Jia et al. |
| 7,970,212 | B2 | 6/2011 | Zahavi et al. |
| 8,121,640 | B2 | 2/2012 | Russ et al. |
| 8,199,117 | B2 | 6/2012 | Izadi et al. |
| 8,224,029 | B2 | 7/2012 | Saptharishi et al. |
| 8,736,583 | B2 | 5/2014 | Anderson et al. |
| 2002/0097439 | A1 | 7/2002 | Brica |
| 2005/0078092 | A1 | 4/2005 | Clapper |
| 2008/0018591 | A1 | 1/2008 | Pittel et al. |
| 2008/0150945 | A1 | 6/2008 | Wang et al. |
| 2009/0102835 | A1* | 4/2009 | Mikhailov ............... G06T 7/12 345/419 |
| 2009/0154778 | A1 | 6/2009 | Lei et al. |
| 2009/0219379 | A1* | 9/2009 | Rossato ................. H04N 5/272 348/14.01 |
| 2011/0242054 | A1 | 10/2011 | Tsu |
| 2013/0077236 | A1 | 3/2013 | Becze et al. |
| 2013/0113920 | A1 | 5/2013 | Blanton et al. |
| 2013/0343601 | A1 | 12/2013 | Jia et al. |
| 2014/0050391 | A1 | 2/2014 | Angelova et al. |
| 2014/0064581 | A1* | 3/2014 | Madabhushi ........ G06K 9/6256 382/128 |
| 2014/0139717 | A1 | 5/2014 | Short |
| 2015/0054974 | A1* | 2/2015 | Ehmann ............... H04N 5/2226 348/218.1 |

OTHER PUBLICATIONS

Alhamzi et al., "3D Object Recognition Based on trnage Features: A Survey," Int'l Journal of Computer and Information Technology, V 03. Issue 03, May 2014, pp. 651-660.

Shahram Izadi et al., "C-Slate: A Multi-Touch and Object Recognition System for Remote Collaboration using Horizontal Surfaces," 2007, pp. 3-10, IEEE.

Gupta, Saurabh, et al.. "Learning rich features from RGB-D images for object detection and segmentation." In European Conference on Computer Vision, pp. 345-360. 2014.

Hernandez-Lopez, J.J. et al. "Detecting objects using color and depth segmentation with Kinect sensor", PROCEDIA Technology, vol. 3, May 18, 2012, pp. 196-284.

Jebari, Islem et al. "Color and Depth-Based Superpixels for Background and Object Segmentation", PROCEDIA Engineering, vol. 41, Aug. 25, 2012, pp. 1387-1315.

* cited by examiner

IMAGE DATA SEGMENTATION

BACKGROUND

Two-dimensional and three-dimensional scanning technology allows for the digital capture or acquisition of the shape, contours, and other features of a physical object. For example, in a two-dimensional scanning application, various hardware and software may be used to capture a paper document or other flat object. In a three-dimensional scanning application, various hardware and software may be used to capture an object such as a user's hand to display the object on a device or monitor or create a digital model.

DETAILED DESCRIPTION

In a computing system, a scanner may be employed to scan both two-dimensional and three-dimensional objects. In some examples, multiple objects may be scanned at once with a single sensor, and the various objects to be scanned may be of different types. For example, a user may attempt to scan a two-dimensional rectangular flat object and a three-dimensional non-rectangular object in one pass within the field-of-view of a sensor.

In such cases, a scanner or other sensor employed in the computing system may not be able to segment or separate (herein "segment") the objects being scanned. For example, the scanner or sensor may not be able to segment the objects from one another, or may not be able to segment the objects from a known or unknown background. Moreover, a scanner or other sensor may not be able to process or optimize the segmentation of objects based on an object classification or type.

According to one example for segmenting image data, image data comprising color pixel data, IR data, and depth data is received from a sensor. The image data is segmented into a first list of objects based on at least one computed feature of the image data. At least one object type is determined for at least one object in the first list of objects. The segmentation of the first list of objects is refined into a second list of objects based on the at least one object type. In an example, the second list of objects is output.

Figure 1:
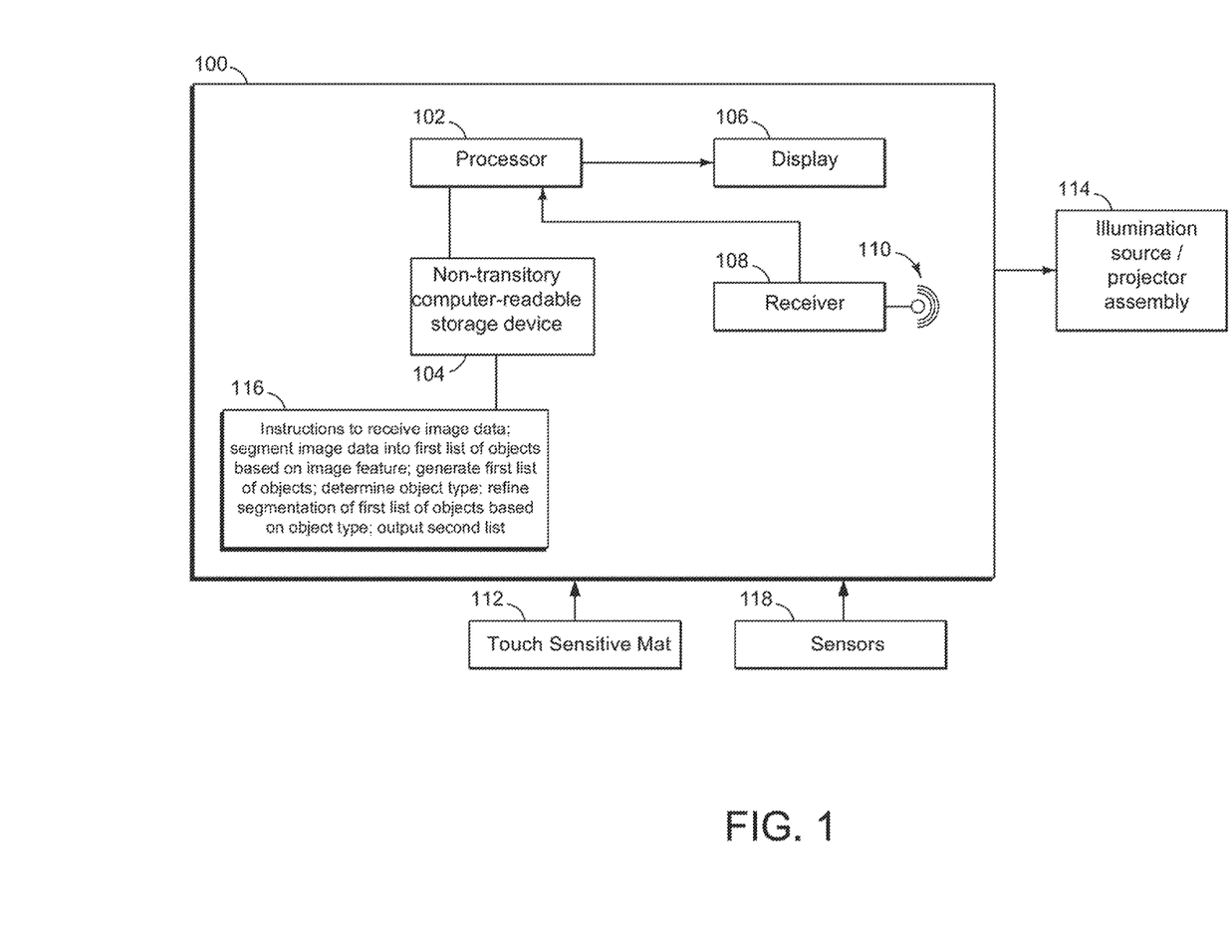
FIG. 1 is a diagram of a device for capturing and segmenting object data, according to an example of the present disclosure.

FIG. 1 is a diagram of a device for capturing and segmenting object data, according to an example of the present disclosure. Device 100 may comprise a processor 102, a non-transitory computer-readable storage device or medium 104, a display or display adapter 106, and a receiver 108. Device 100 may be coupled to a mat or touch sensitive mat 112, illumination source/projector assembly 114, and sensors 116, as discussed below in more detail.

Figure 2:
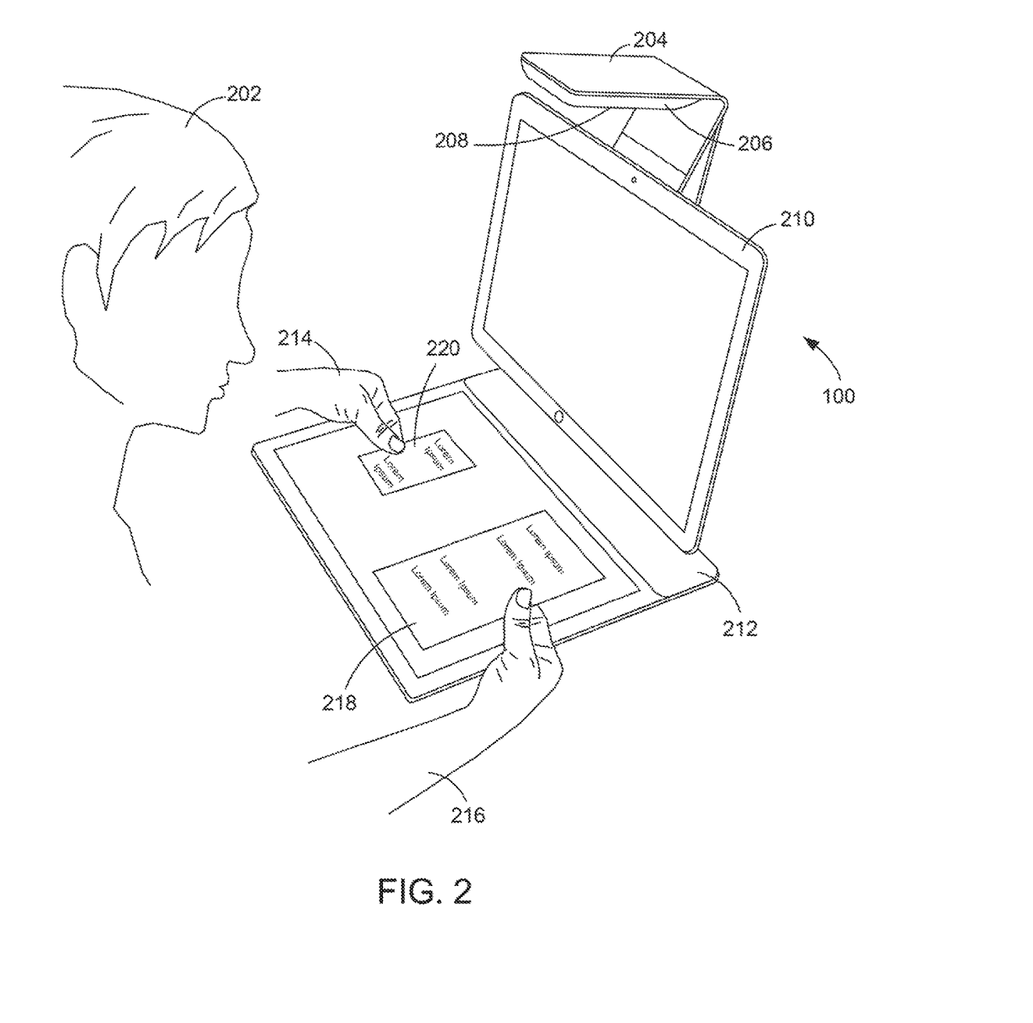
FIG. 2 is a perspective view of the device of FIG. 1 with a first set of objects, according to an example of the present disclosure.

FIG. 2 is a perspective view of the device of FIG. 1 with a first set of objects, according to an example of the present disclosure.

In an example, FIG. 1 illustrates a computer system or device 100 ("device") utilized by at least one user 202, which may hold objects in hands 214 or 216, or place objects on a mat 212 or, in general, on a surface such that the user may not be required to hold an object during a scanning operation.

As discussed below in more detail, device 100 may comprise a sensor cluster 204, one or more sensors ("sensors") 206, a projector (or projector and mirror system) 208 (hereinafter "projector"), a display 210, and mat 212. In some examples, mat 212 may be touch-sensitive. In some examples, display 210 may display a document or other object captured by the sensors 206, as discussed below in more detail.

Device 100 may be used to capture or scan an object such as the documents 218 and 220 of FIG. 2. In some examples, document 218 may be a piece of paper, while document 220 may be a paper receipt. In some examples, a real-time representation of the objects 218 and 220 being captured or scanned may be displayed on display 210.

Device 100 in general may comprise any suitable computing device such as a desktop computer, laptop computer, notebook, netbook, all-in-one computer, tablet, or smartphone capable of interfacing with at least one sensor. Device 100 may comprise a processor, a memory, and storage, which may be electrically coupled to one another. User inputs sensed or received by sensors 206 or mat 212 may also be communicated to device 100, including to the processor, memory, and storage of device 100.

Display 210 may also be supported by a support structure (not shown), which may include a base and an upright member. The support structure may support the weight of display 210, as well as sensor cluster 204 and sensors 206, which may be cantilevered such that sensors 206 hover over mat 212.

Sensor cluster 204 may comprise one or more sensors 206 and/or one or more illumination sources, such as a projector 208. Projector 208 may comprise any suitable digital light projector assembly for receiving data from a computing device and projecting an image or images that correspond with that input data.

Sensors 206 may include a plurality of sensors and/or cameras to measure and/or detect objects or parameters below or within the field-of-view of sensors 206. For example, sensors 206 may comprise an ambient light sensor, a camera, a depth sensor, and a three-dimensional (3D) user interface sensor. Sensors 206 may compute, detect, generate, or otherwise sense gradients, edges, intensities, colors, textures, and/or regions or images and/or objects.

In an example, a camera 206 may comprise a color camera arranged to capture a still image or a video of objects and/or documents disposed on mat 212 or generally below or within the field-of-view of sensors 206.

In an example, a depth sensor 206 may indicate when a three-dimensional object is on a work surface, such as on mat 212 or, in other examples, a table or other surface suitable for scanning. In particular, depth sensor 206 may sense or detect the presence, shape, contours, motion, and/or the depth of a three-dimensional object, or specific feature(s) of an object. Thus, in some examples, depth sensor 206 may employ any suitable sensor or camera arrangement to sense and detect an object and/or the depth values of each pixel, whether infrared, color, or other, disposed in the sensor's field-of-view. In some examples, depth sensor 206 may comprise a single infrared (IR) camera sensor with a uniform flood of IR light, a dual IR camera sensor with a uniform flood of IR light, structured light depth sensor technology, time-of-flight (TOF) depth sensor technology, or some combination thereof.

In an example, an ambient light sensor 206 may be arranged to measure the intensity of light of the environment surrounding device 100, in order to, in some examples, adjust exposure settings of another sensor in sensor cluster 204, and/or adjust the intensity of the light emitted from other sources throughout the device such as, for example, projector 208, or display 210.

In an example, a user interface sensor 206 may comprise any suitable device or devices (e.g., sensor or camera) for tracking a user input device such as, for example, a hand, stylus, pointing device, etc. In some examples, user interface sensor 206 may include a pair of cameras which are arranged to stereoscopically track the location of a user input device, e.g., a stylus, as it is moved by a user 202 within the field-of-view of sensors 206. In other examples, user interface sensor 206 may include infrared camera(s) or sensor(s) that are arranged to detect infrared light that is either emitted or reflected by a user input device.

In various examples, sensor cluster 204 may comprise other sensors and/or cameras either in lieu of or in addition to sensors described above, and/or in different configurations, such as for use with a desktop, tablet, or smartphone.

Sensors 206 in sensor cluster 204, or any sensors 206 accessible by device 100 in general, may be electrically and communicatively coupled to one another and/or device 100 or components of device 100 such that data generated within sensor cluster 204 may be transmitted to device 100, and commands issued by device 100 may be communicated to the sensors 206.

Figure 3:
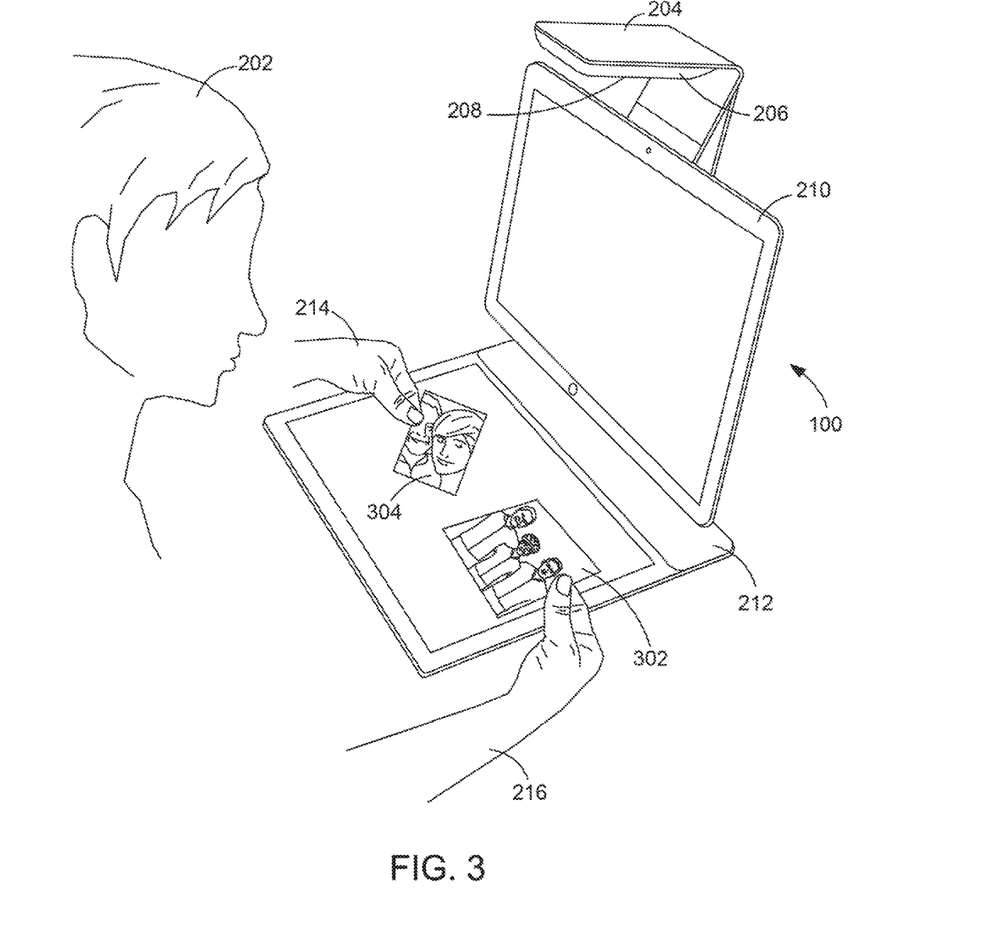
FIG. 3 is a perspective view of the device of FIG. 1 with a second set of objects, according to an example of the present disclosure.

FIG. 3 is a perspective view of the device of FIG. 1 with a second set of objects, according to an example of the present disclosure. In an example, objects 302 and 304 may be color photographs of a rectangular shape, in various orientations or at various angles.

Figure 4:
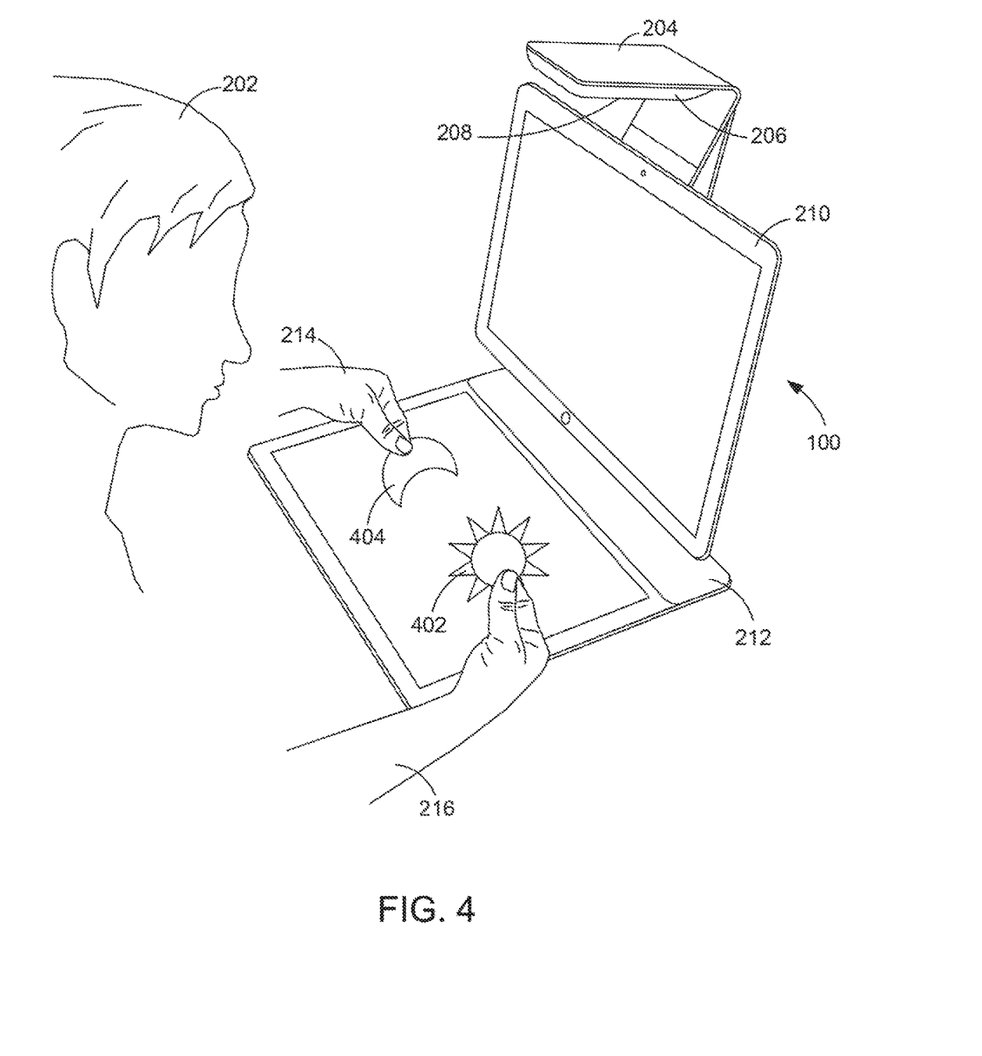
FIG. 4 is a perspective view of the device of FIG. 1 with a third set of objects, according to an example of the present disclosure.

FIG. 4 is a perspective view of the device of FIG. 1 with a third set of objects, according to an example of the present disclosure. In an example, objects 402 and 404 may be a sticker or other flat, non-rectangular object, in various orientations or at various angles.

Figure 5:
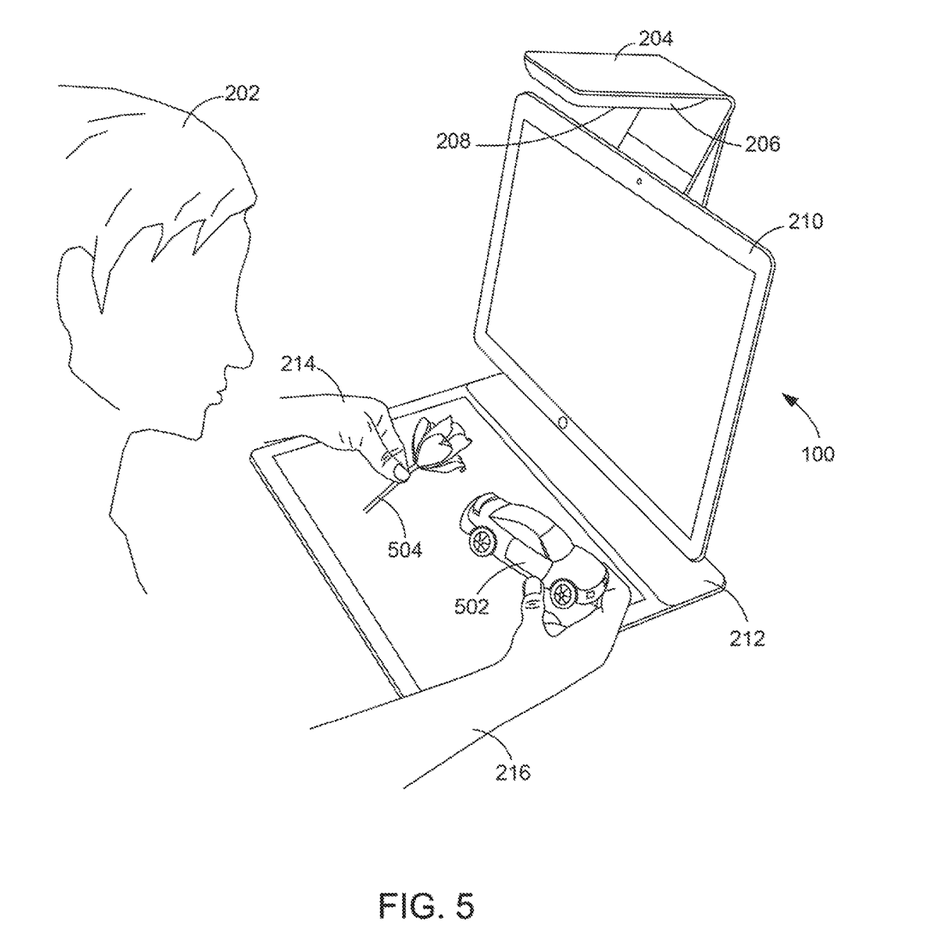
FIG. 5 is a perspective view of the device of FIG. 1 with a fourth set of objects, according to an example of the present disclosure.

FIG. 5 is a perspective view of the device of FIG. 1 with a fourth set of objects, according to an example of the present disclosure. In an example, objects 502 and 504 may be 3D objects, in various orientations or at various angles.

Figure 6:
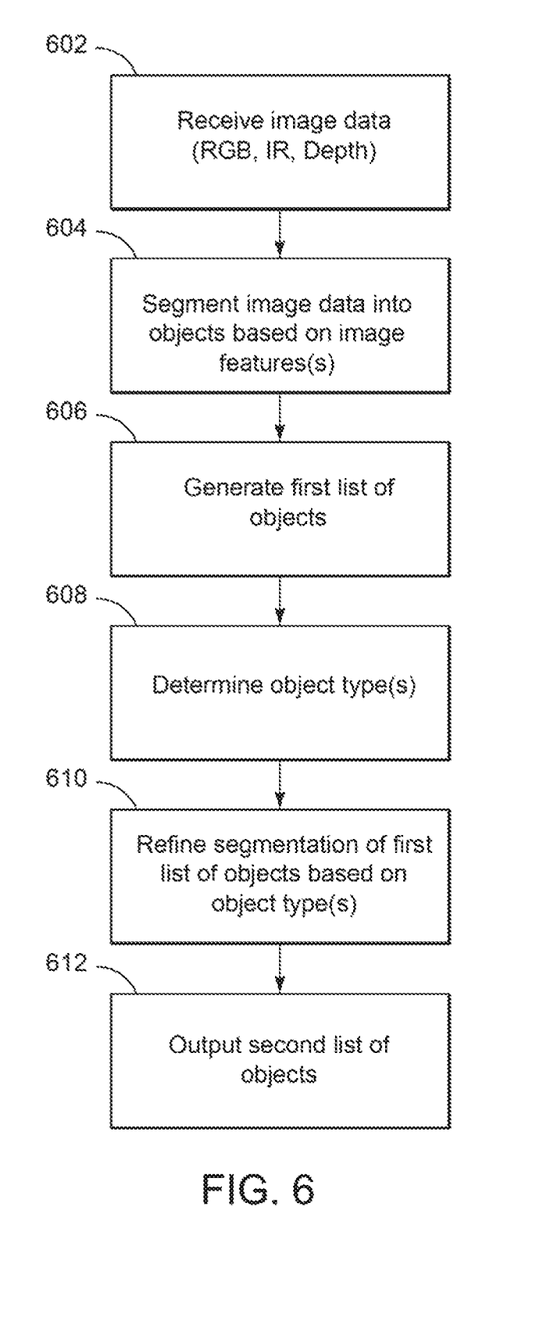
FIG. 6 illustrates a flow diagram of capturing and segmenting image data, according to an example of the present disclosure.

FIG. 6 illustrates a flow diagram of capturing and segmenting image data, according to an example of the present disclosure.

In block 602, image data is received, processed, or captured by, e.g., sensors 206 or other sensors capable of capturing or detecting two-dimensional or three-dimensional object data. Image data may include color pixel data such as RGB or YUV data, IR data, depth data, and/or other data or parameters related to the image data. In some examples, video data may be received, or a video frame may be received. In some examples, the image data received in block 602 may be captured against a known background, e.g., mat 112 or other known surface.

In block 604, the image data from block 602 is segmented into objects based on features of the image data. As some examples, image features may include gradients, edges, intensities, colors, textures, and/or regions of the image. As one example, block 604 may comprise applying an edge-detection algorithm. The segmentation of block 604 is discussed in more detail below with respect to FIG. 7.

In block 606, a first list of objects is generated based on the segmentation of block 604. For example, in block 604, an edge-detection algorithm may have detected two objects, e.g., the two objects 218 and 220 shown in FIG. 2, which may be used to populate the first list of objects in block 606. In some examples, the first list of objects may be a preliminary, rough, or unrefined list of objects based on the segmentation of block 604. Algorithms such as connected component analysis may also be applied to, e.g., detect a bounding box for an object, an aspect ratio for an object, or other parameter or property.

In block 608, an object type for each of the objects in the first list of objects may be determined. Various algorithms may be used to determine an object type based on, e.g., shape, depth, color, or other features or attributes of an object.

In one example, a depth map received from a sensor in block 602 may be compared in block 608 to the first list of objects generated in block 606. For each match between the depth map and the first list of objects, a determination may be made that the object is three-dimensional. For each object in the first list of objects that does not match an object in the depth map, a determination may be made that the object is two-dimensional. In other examples, for each object in the first list of objects, a corresponding region in the depth map may be examined to determine if the object is three-dimensional.

In block 608, the objects of the above example may be further typed or classified based on other features of the objects. For example, the objects may be classified as a grayscale rectangle, or as a color circle. Various combinations of classifications may also be generated.

In one example, in block 608, line-fitting techniques such as sensing for parallel or perpendicular lines may be applied to determine if an object is rectangular. In another example, color detection algorithms may be applied to determine if an object is grayscale or color.

In block 610, the first list of objects is refined based on the object type or types determined in block 608. As discussed below in more detail with respect to FIG. 8, refining the first list of objects may comprise applying certain functions, filters, or algorithms for each object type to refine the segmentation of the first list of objects.

In block 612, an updated or second list of objects, following additional segmentation in block 610, is output. The second list of objects may comprise the same list of objects in the first list of objects, plus additional information or properties related to the refined segmented objects, such as bounding boxes or contours. For example, the second list of objects may include refined locations, sizes, edges, boundaries, colors, or other object properties relevant to the segmentation refinement. As one example, an object in the first list of objects with jagged edges may appear in the second list of objects with properties representing smoothened edges. In another example, an object in the first list of objects may appear in the second list of objects with pixel boundaries shifted, or with a contrast adjustment. In some examples, the second list of objects may be output to a user, to a software program, to a printer or 3D printer, or to another output source.

Figure 7:
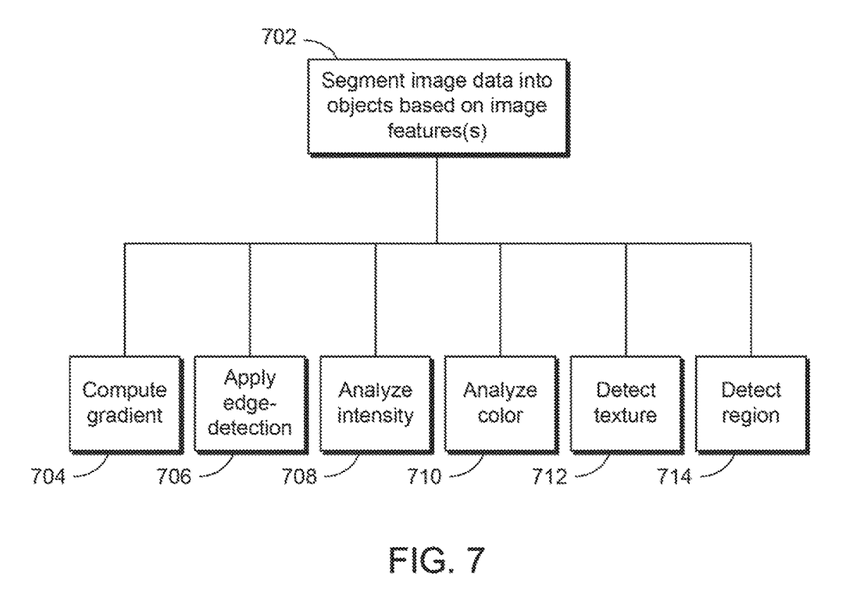
FIG. 7 illustrates a flow diagram of segmenting image data based on image features, according to an example of the present disclosure.

FIG. 7 illustrates a flow diagram of segmenting image data based on image features, according to an example of the present disclosure, as discussed above with respect to block 604. One of blocks 704 through 714, or a combination of blocks 704 through 714, may be used to segment image data into objects based on image features, attributes, or properties. In some examples, the image features may be computed. In other examples, the image features or values may be derived, accessed, or otherwise obtained without a computation.

According to one example, in block 704, a gradient or gradients are computed for the image data received in block 602. Gradient data for two or more RGB or YUV channels in the image data may be computed or detected, with the channels combined into a single gradient map. In some examples, data from an infrared channel may also be detected and combined into a single gradient map.

In some examples, background information detected in the gradient map may be removed or ignored to result in a map of objects in the image data for segmentation. Background removal may comprise starting from the edges of the image data, e.g., the edges of the sensor field-of-view, and applying a region-growing algorithm to remove background data and/or detect objects.

According to one example, in block 706, an edge detection algorithm such as the Canny edge detector may be applied to the image data. Edge detection may comprise identifying points of a brightness level change in the image data to compute or detect the edge of an image, to segment objects in the image data.

According to one example, in block 708, intensities of pixel values in the image data may be analyzed or computed. Analyzing intensities may comprise applying algorithms such as the watershed segmentation algorithm. In some examples, a texture segmentation algorithm may compute texture features over an image to derive a texture map. Homogeneous regions in the texture map may correspond to objects or at least parts of objects with similar appearances, allowing for segmentation.

According to one example, in block 710, colors may be analyzed or computed in the image data. For each pixel, for example, a colorspace may be used to segment objects in the image data. For example, RGB values may be converted to HSV comprising hue, saturation, and value. Other features, such as gradients as described in block 704, may then also be computed using the converted colorspace.

According to one example, in block 712, textures may be detected or computed in the image data. For example, relationships between a pixel and a neighboring pixel or region may be detected to segment objects in the image data. For example, for each centered pixel, a relationship can be determined between the centered pixel and surrounding pixels to create a texture map of homogenous texture regions. In some examples, a gray-level co-occurrence matrix may be used to detect textures.

According to one example, in block 714, regions may be detected or computed in the image data. For example, a group of pixels having similar characteristics may be identified as a region. In some examples, a mean-shift algorithm may be used in region detection to segment objects in the image data.

Figure 8:
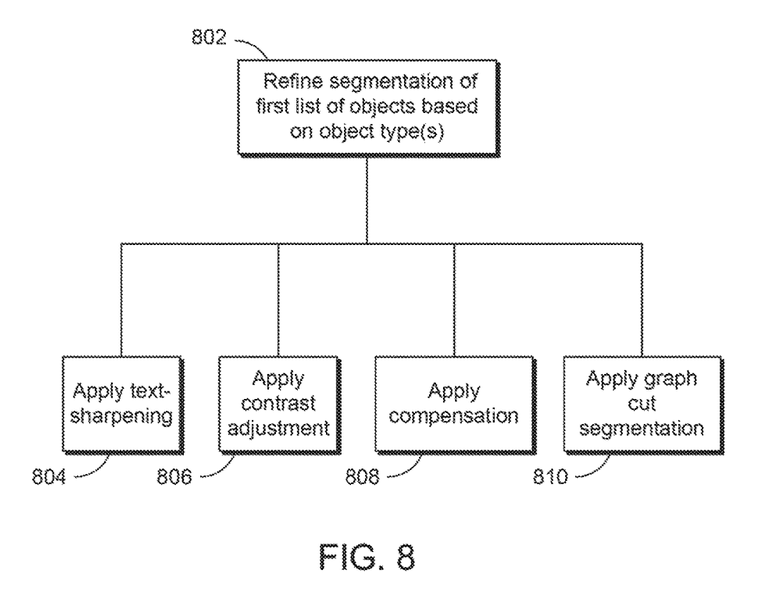
FIG. 8 illustrates a now diagram of refining the segmentation of a first list of objects based on object types, according to an example of the present disclosure.

FIG. 8 illustrates a flow diagram of refining the segmentation of the first list of objects based on object types, according to an example of the present disclosure, as discussed above with respect to block 610. One of blocks 804 through 810, or a combination of block 804 through 810, may be used to refine the segmentation of the first list of objects based on the object type or types determined in block 608. More specifically, in some examples, refining the segmentation of the first list of objects may comprise applying a refinement of segmentation boundaries, or a refinement of the visual appearance of the objects.

In block 804, as one example, if an object is determined to be a two-dimensional rectangular document in grayscale, a text-sharpening filter or algorithm may be applied. In other examples, other filters or algorithms related to image processing may be applied.

In block 806, as an example, if an object is determined to be a two-dimensional rectangular document in color, such as a photo, a color or contrast adjustment filter or algorithm may be applied. In other examples, other contrast, brightness, or color filters or algorithms may be applied.

In blocks 808 and 810, as examples, if an object is determined to be a two-dimensional non-rectangular object or a three-dimensional object, a compensation filter or algorithm such as boundary smoothing, boundary refinement, and/or image matting may be applied. As another example, a graph cut algorithm may be applied to restore background or gradient data for an object that was over-removed in previous processing, such as in block 704 in an example. In other examples, other compensation filters or algorithms may be applied.

Figure 9:
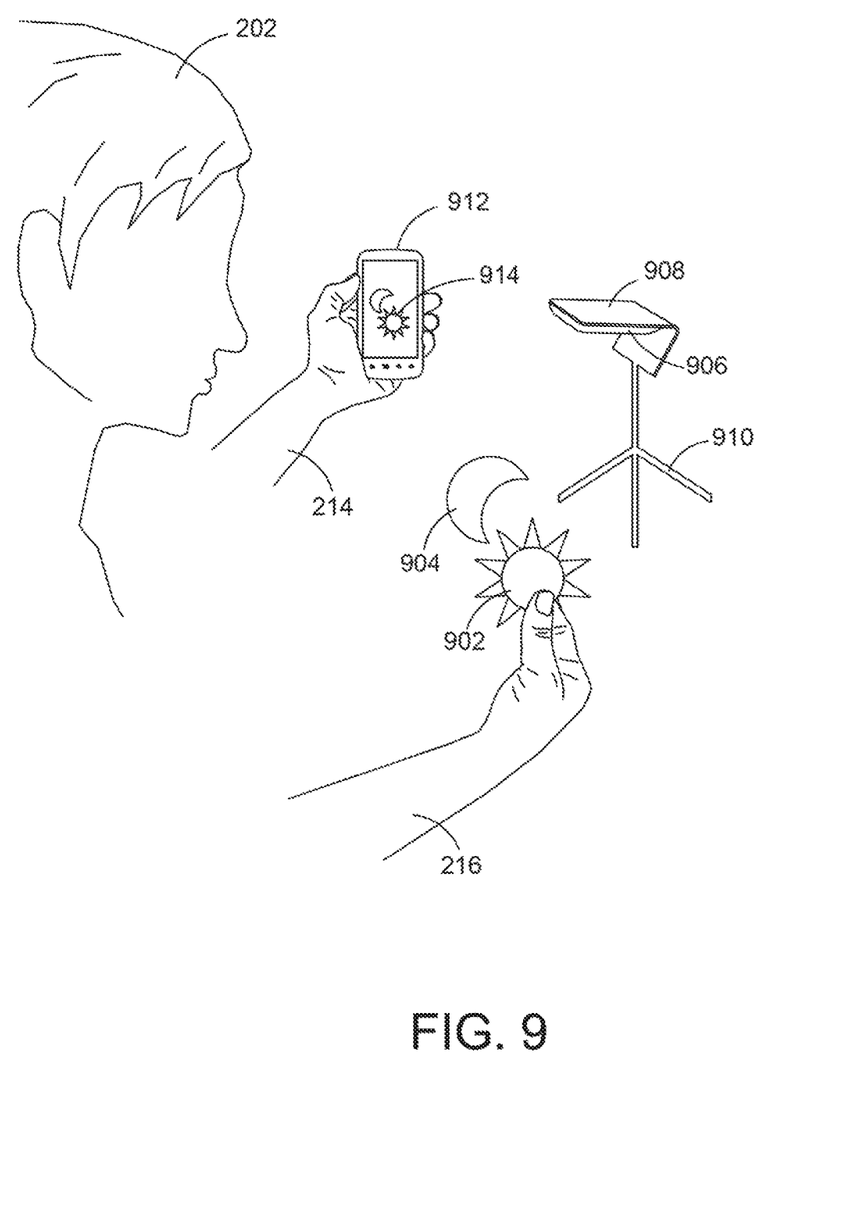
FIG. 9 is a perspective view of a mobile computer system with a first set of objects, according to an example of the present disclosure.

FIG. 9 is a perspective view of a mobile computer system with a first set of objects, according to an example of the present disclosure. In various examples, the sensor cluster 204, display 210, and mat 212 of FIG. 2 may be replaced by, eliminated, or consolidated into other components. For example, sensors 906 and a sensor cluster 908 may be mounted on a tripod 910 or otherwise mounted, or handheld. As another example, a display 210 may be consolidated into a mobile device 912 with a mobile display 914.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A method of segmenting image data, comprising:
 receiving image data from a sensor comprising color pixel data, infrared data, and depth data, wherein the image data is associated with an image of a plurality of different objects placed on a mat of a device that are within a field of view of the sensor;
 segmenting the image data into a first list of objects based on at least one computed feature of the image data, wherein the first list of objects includes each one of the plurality of different objects;
 determining at least one object type for at least one object in the first list of objects;
 refining the first list of objects that is segmented into a second list of objects based on the at least one object type; and
 outputting the second list of objects.

2. The method according to claim 1, wherein the determining at least one object type for at least one object in the first list of objects comprises accessing the depth data received from the sensor and comparing the depth data to the first list of objects.

3. The method according to claim 1, wherein the segmenting the image data into a first list of objects based on the at least one computed feature of the image data comprises computing gradient data in the image data.

4. The method according to claim 1, wherein the segmenting the image data into a first list of objects based on the at least one computed feature of the image data comprises applying an edge-detection algorithm to the image data.

5. The method according to claim 1, wherein the segmenting the image data into a first list of objects based on the at least one computed feature of the image data comprises analyzing an intensity of at least one pixel value in the image data.

6. The method according to claim 1, wherein the segmenting the image data into a first list of objects based on the at least one computed feature of the image data comprises converting a colorspace of at least one pixel value in the image data.

7. The method according to claim 1, wherein the segmenting the image data into a first list of objects based on the at least one computed feature of the image data comprises detecting a texture of at least one pixel and at least one adjacent pixel in the image data to create a texture map.

8. The method according to claim 1, wherein the segmenting the image data into a first list of objects based on the at least one computed feature of the image data comprises detecting a region of similar pixels in the image data.

9. The method according to claim 1, wherein the refining the segmentation of the first list of objects into a second list of objects based on the at least one object type comprises applying one or more of a text sharpening filter, a contrast adjustment, a compensation, and a graph cut segmentation.

10. A system for capturing and segmenting image data, comprising:
    a support structure including a base;
    a sensor attachable to the support structure, wherein the sensor an image of a plurality of different objects placed on a mat of the system that are within a field of view of the sensor; and
    a computer communicatively coupled to the sensor;
    wherein the computer is to receive image data associated with the image comprising at least RGB data and depth data from the sensor, segment the image data into a first list of objects based on at least one computed feature the image data, wherein the first list of objects includes each one of the plurality of different objects, and refine the first list of objects that is segmented into a second list of objects based on at least one object type; and
    wherein the computer is to output the second list of objects.

11. The system according to claim 10, wherein the at least one computed feature of the image data comprises one or more of a computed gradient, edge, intensity, color, texture, and region in the image data.

12. The system according to claim 10, wherein the computer is to compute gradient data for two or more RGB channels in the image data and combine the channels into a single gradient map.

13. The system according to claim 10, wherein the image data further comprises data relating to a known background.

14. A non-transitory computer readable storage medium on which is embedded a computer program, said computer program to segment three-dimensional image data, said computer program comprising a set of instructions to:
    receive three-dimensional image data from a sensor, wherein the three-dimensional image data is associated with an image of a plurality of different objects placed on a mat of a device that are within a field of view of the sensor;
    segment the image data into a first list of objects based on one or more of a gradient, an edge, an intensity, a color, a texture, and a region of the image data, wherein the first list of objects includes each one of the plurality of different objects;
    determine at least one object type for at least one object in the first list of objects;
    refine the first list of objects that is segmented into a second list of objects based on the at least one object type; and
    output the second list of objects.

15. The non-transitory computer readable storage medium according to claim 14, further comprising instructions to apply one or more of a text sharpening filter, a contrast adjustment, a compensation, and a graph cut segmentation to refine the segmentation of the first list of objects into a second list of objects.

* * * * *

UNITED STATES PATENT AND TRADEMARK OFFICE
CERTIFICATE OF CORRECTION

PATENT NO. : 10,217,223 B2
APPLICATION NO. : 15/518416
DATED : February 26, 2019
INVENTOR(S) : Su Wang et al.

It is certified that error appears in the above-identified patent and that said Letters Patent is hereby corrected as shown below:

On the Title Page

In item (56), FOREIGN PATENT DOCUMENT, in Column 2, Line 1, delete "10/2009" and insert -- 05/2014 --, therefor.

In the Drawings

In sheet 6 of 8, reference numeral 604, Line 3, delete "features(s)" and insert -- feature(s) --, therefor.

In sheet 7 of 8, reference numeral 702, Line 3, delete "features(s)" and insert -- feature(s) --, therefor.

In the Claims

In Column 8, Line 2, in Claim 10, after "feature" insert -- of --.

Signed and Sealed this
Second Day of July, 2019

Andrei Iancu
*Director of the United States Patent and Trademark Office*